United States Patent
Berger et al.

(10) Patent No.: US 7,162,451 B2
(45) Date of Patent: Jan. 9, 2007

(54) INFORMATION CONTENT DISTRIBUTION BASED ON PRIVACY AND/OR PERSONAL INFORMATION

(75) Inventors: Stefan Berger, Ossining, NY (US); Chatschik Bisdikian, Chappagua, NY (US); Nathan Junsup Lee, New City, NY (US); Mahmoud Naghshineh, Hopewell Junction, NY (US); Veronique Perret, Tarrytown, NY (US); Daby Mousse Sow, Riverdale, NY (US)

(73) Assignee: International Business Machines Corporation

( * ) Notice: Subject to any disclaimer, the term of this patent is extended or adjusted under 35 U.S.C. 154(b) by 851 days.

(21) Appl. No.: 10/082,536

(22) Filed: Feb. 21, 2002

(65) Prior Publication Data

US 2003/0105719 A1 Jun. 5, 2003

(51) Int. Cl.
*G06Q 99/00* (2006.01)
*H04K 1/00* (2006.01)
*H04L 9/00* (2006.01)

(52) U.S. Cl. .............. 705/51; 705/14; 705/75; 705/39; 705/57; 705/80; 705/26; 380/30; 707/10; 707/9; 707/3; 707/6; 709/217; 709/203; 709/219; 235/380; 715/513

(58) Field of Classification Search .............. 705/14, 705/26, 39, 51, 57, 75, 80; 380/30; 707/3, 707/6, 9, 10; 709/203, 217, 230; 235/380; 715/513
See application file for complete search history.

(56) References Cited

U.S. PATENT DOCUMENTS

| 5,312,521 A | 5/1994 | Fraas et al. |
| 6,226,618 B1 | 5/2001 | Downs et al. |
| 6,519,571 B1 * | 2/2003 | Guheen et al. ............... 705/14 |
| 6,834,195 B1 * | 12/2004 | Brandenberg et al. ... 455/456.3 |
| 6,879,963 B1 * | 4/2005 | Rosenberg ............... 705/26 |
| 6,947,910 B1 * | 9/2005 | Hsu et al. ............... 705/57 |

FOREIGN PATENT DOCUMENTS

JP H03-282733 * 12/1991

OTHER PUBLICATIONS

Perritt, Henry H. "Knowbots, Permissions Headers and Contract Law" (Apr. 30, 1993).*

* cited by examiner

*Primary Examiner*—James A Reagan
(74) *Attorney, Agent, or Firm*—Louis P. Herzberg

(57) ABSTRACT

The present invention provides methods and apparatus to protect user privacy while accessing information in public places, using both public and personal devices. This is achieved by employing a mechanism that prevents private information from being displayed on public devices. Instead, this type of information is made available only to a user's personal device(s) that the user carries and/or trusts. An example embodiment of the invention shows relevant parts of the information content, referred to also as information documents or simply documents, to multiple devices based on privacy level and user preferences. Embodiments of the present invention also provide personalized services based on privacy levels defined by users. These users can for example be customers of a retail store. The service provided is sometimes also based on user history of accessing information documents. It permits personalized information to be sent to a customer's personal device.

25 Claims, 6 Drawing Sheets

_US 7,162,451 B2_

INFORMATION CONTENT DISTRIBUTION BASED ON PRIVACY AND/OR PERSONAL INFORMATION

PRIORITY

This application claims priority to Provisional application entitled, "Information Content Distribution Based on Privacy and/or Personal Information", filed Nov. 30, 2001, assigned Ser. No. 60/334,367.

FIELD OF THE INVENTION

This invention is directed to the field of computer content distribution. It is more particularly directed to the application of content distribution in business environments.

BACKGROUND OF THE INVENTION

The retail-store business is known for continuously pushing the envelop for improved customer service. For years, the retailers have been sending tailored advertisements in the mail hoping to lure new and old customers to come to their stores more often, or use TV advertisements in local cable TV systems to promote their stores to their localities. Some retail stores use TV monitors to play their advertisements continuously. With the advent of the Internet and the Worldwide Web, many retailers have started placing advertisements for their stores on Web pages as well.

Music and book stores have started adding electronic kiosks to assist customers to locate what they are looking for or to advertise special promotions. However, using such public displays, like the kiosks or the TV monitors, where everyone can peek what other people are looking for, and special promotions they may be getting, could intrude into the people's privacy. This invention discloses a method and an apparatus to distribute information content to groups of individuals based on privacy constraints and personal information.

SUMMARY OF THE INVENTION

This invention provides methods and apparatus to protect user privacy while accessing information in public places, using both public and personal devices. This is achieved by employing a mechanism that prevents private information from being accessed on public devices. Instead, this type of information is made available only to a user's personal device(s) that the user carries and trusts. Accordingly, the proposed invention shows relevant parts of the information content, referred also as information documents or simply documents, to multiple devices based on privacy level and user preferences.

In an example embodiment, each individual creates a profile that includes an indication of what is private and what is not. In an example setting, these profiles are dynamic and evolve from an original default state that is provided by the content provider. The content provider fragments the document into portions and generates the original state by assigning initial levels of privacy to each of these portions. As each client accesses information documents and specifies its desired privacy level, the personal profile is adjusted to fit one's specific needs, 509. Based on these profiles and the history on the documents accessed, the information documents are fragmented and different portions of the documents are displayed on each device. The present invention provides personalized services based on privacy levels defined by users. These users include customers of a retail store. Service provision is also based upon user history in accessing information documents. It permits personalized information to be sent to a customer's personal device.

In some embodiments the personal device is supplied with Bluetooth wireless technology and a content distribution server, 101, is utilized as well as an agent for building custom profiles and a database for storing the customer profiles, 102. When a user/customer with the Bluetooth personal device comes in the range of a Bluetooth radio transceiver on the apparatus, the personal device sends its identification to the content distribution server. The content distribution server then queries the profile database to find the customer's profile that contains the customer's own definition of privacy as well as the customer's membership level. The content distribution server then builds a new set of distribution rules. Based on these rules, different parts of the content are shown either on a public computer with a public display or merchant's display and or on the customer's device. The Web page for the selected product contains different promotional offers for each category of customers. Any part of the content that is considered private information is not displayed on the public screen but is displayed on the customer's personal device instead. The merchant receives what is considered private to the merchant. The information that is considered as public may also be displayed by all devices.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

This invention provides methods and apparatus to protect user privacy while accessing information in public places, using both public and personal devices. This is achieved by employing a mechanism that prevents private information from being accessed on public devices. Instead, this type of information is made available only to a user's personal device(s) that the user carries and trusts. Accordingly, the proposed invention shows relevant parts of the information content, referred also as information documents or simply documents, to multiple devices based on privacy level and user preferences.

Figure 1:
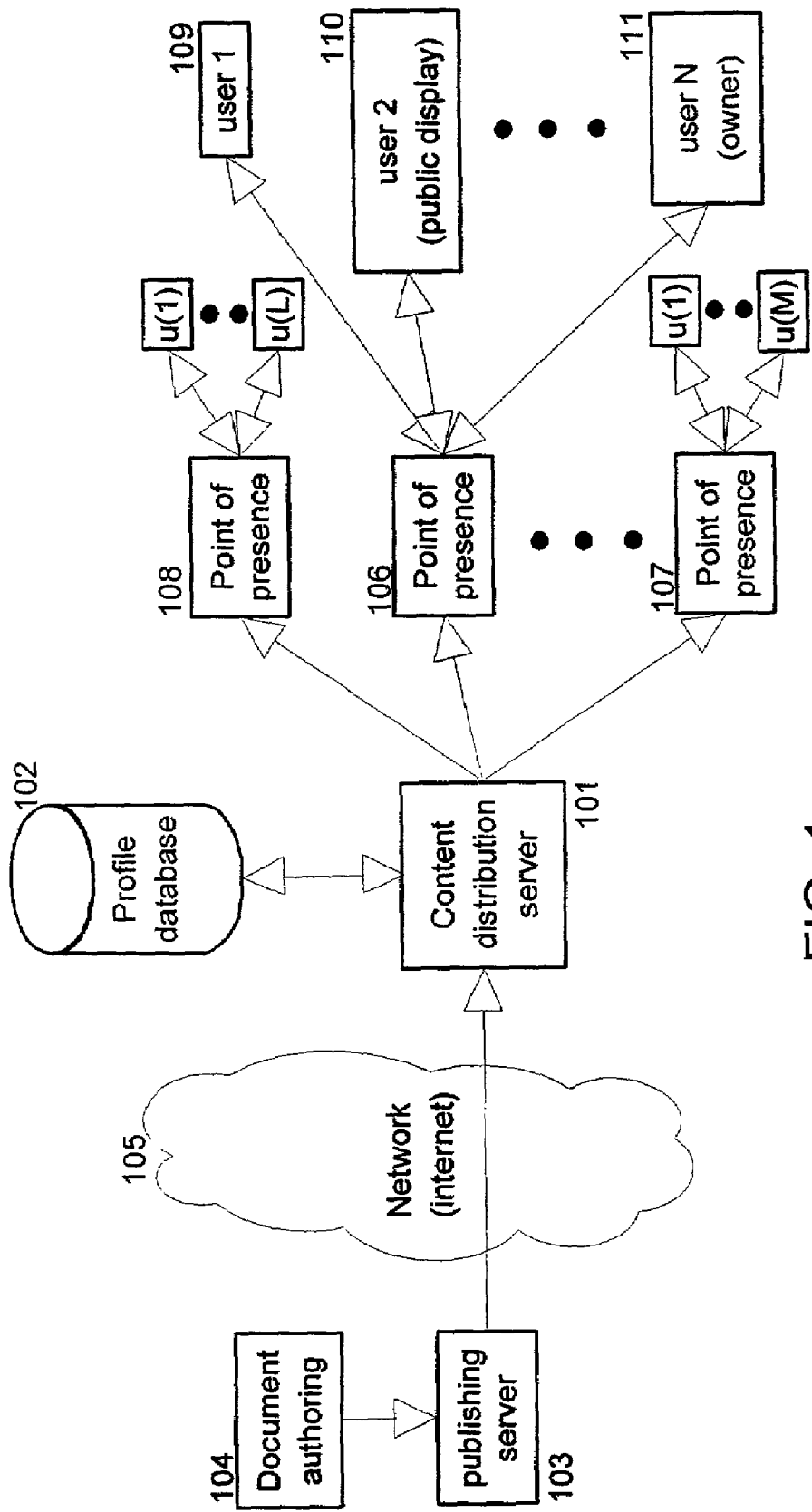
FIG. 1 shows an overall example architecture of this invention.
Figure 5A:
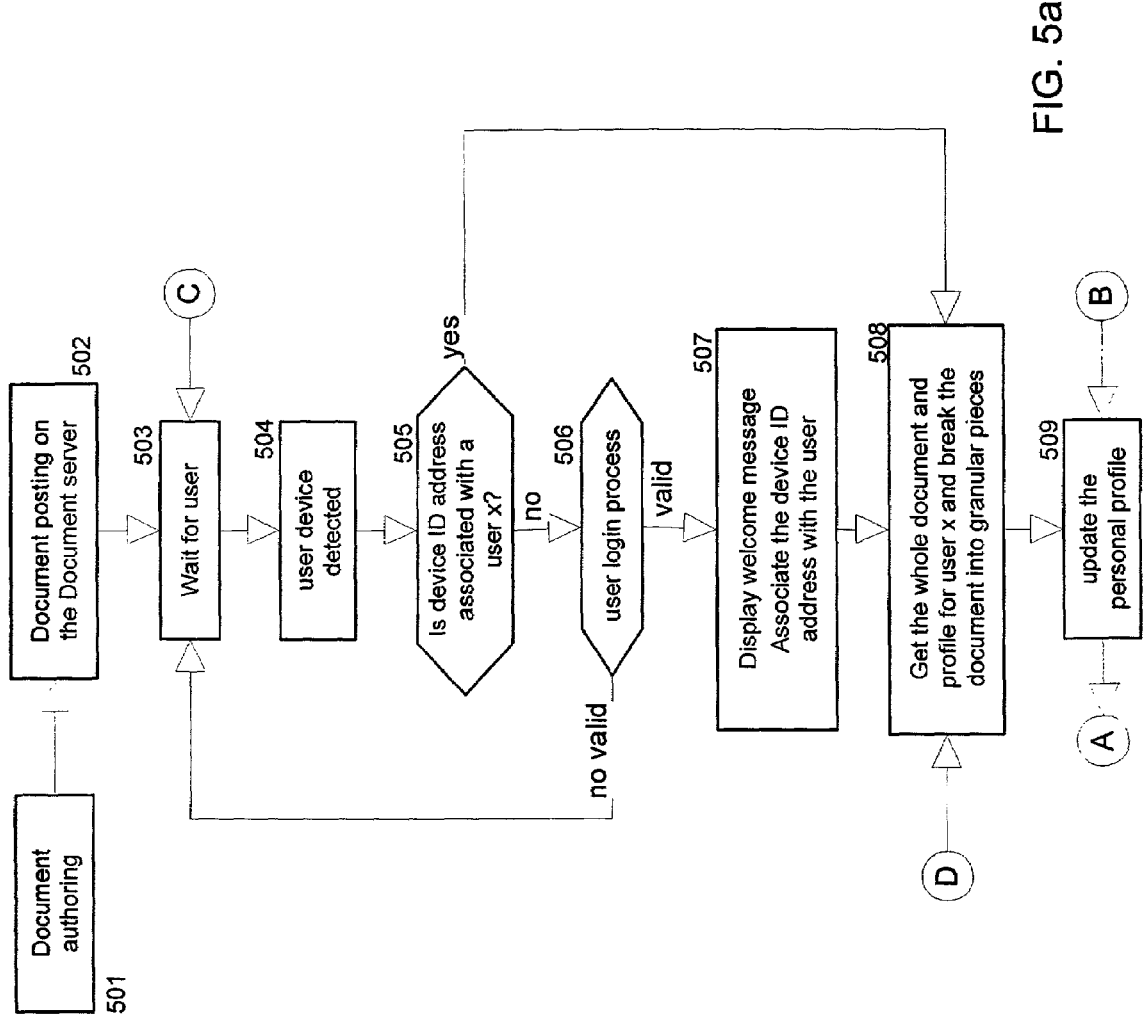
FIG. 5*a* and FIG. 5*b* together show an example of a flow chart of steps followed during the execution of the present invention for a single log-on for user x.
Figure 5B:
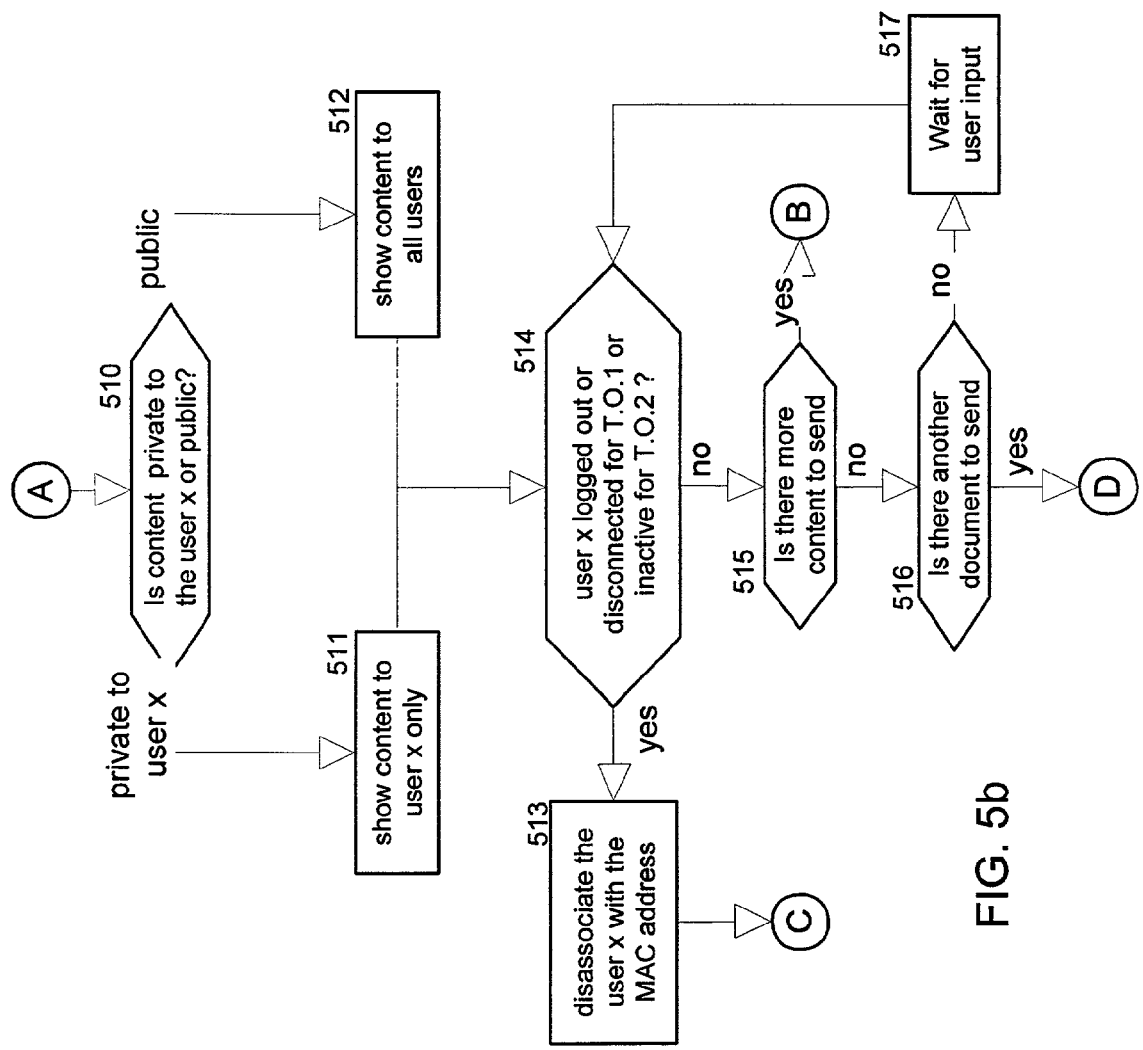

Referring to FIG. 1, showing an example architecture of the invention, and FIG. 5, which shows an example of a flow chart of steps followed during the execution an embodiment of the present invention, in which an original information document, such as a Web page, is authored, 104, 501, and placed at a document server, 103, such as a Web server, 502.

The document server may be placed anywhere in the network, 105. It could be within a business intranet or over the public Internet or it may be physically placed as a part of the content distribution server, 101. The content distribution server, 101, is responsible for providing the information contained in information documents that are destined to particular user devices based on the rules defined in the personal profile that is stored in the profile database, 102, for that group of user devices.

There are many ways to use these rules to protect the privacy of the users. One approach is to associate encryption keys with each group of users, encrypt the relevant fragments of content for a given group with the right key and broadcast all the content to all the devices. These devices would then be able to decrypt only the fragments that were meant to be rendered by them.

Another approach consists of using these rules to split the content for each user or group of users, at the content distribution server. Fragments are then sent from the content distribution server only to those devices that have the right to display them.

One or more points of presence, 106, 107, 108, that are conveniently located throughout the store are responsible for detecting the target devices 109, 110, 111. They also serve as access points to the network, 105. The target device may be a public display, 110, merchant's or retailer's device, 111, or the customer's device, 109. Some of these target devices such as the public display, 110, may be physically integrated with a point of presence, 106.

Once the device identification address, such as the medium access control (MAC) address of the user's device, 109, is registered as the user logs onto a document viewing session, 506, the address is associated with the user, 505, as long as the user stays logged in and actively participates in the session within the area of coverage. Therefore, the user does not need to log in as the user moves around the store from one point of presence to another.

Shopping in a store that is enabled by the teachings of this invention complements the traditional shopping experience with wireless points of presence in the store waiting for users, 503. Wireless points of presence are wireless (such as Bluetooth or 802.11 Wireless LAN) enabled points of sale or public kiosks through which a content distribution server, 101, can provide granular distribution of the information to various users, 109, 110, 111. This allows a better service of customers by providing a way to reach the customer during one's shopping experience. In particular, using the device discovery capability of Bluetooth radio transceivers, the kiosk that is equipped with a Bluetooth transceiver can detect, 504, the presence of its valuable customers' personal devices and associate the customer with its MAC address. The MAC address of a device may be pre-registered and then provided again by the device during the log-in process enabling personalized promotions anywhere within its range of coverage area. Customers with Bluetooth enabled personal devices can use these devices as a part of their enhanced shopping experience solution to receive customized information.

This invention enables personalized services based on customer membership level as well as their shopping history. To permit personalized information to be sent to a customer's Bluetooth personal devices, each wireless point of presence, 106, is enabled with a proxy for a content distribution server, 101. When a customer with the Bluetooth personal device, 109, comes in range of a Bluetooth radio transceiver on the wireless points of presence, 106, the personal device sends its identification to the device discovery of the wireless points of presence, 106. Then the content distribution server, 101, queries the database, 102, to find a customer's personal profile, membership level and shopping history and builds a new set of information distribution rules. Based on these rules, the content is either shown on the public display, 110, or on the customer's device, 109. The Web page of the selected product may contain different promotional offers for each category of customers. The customer's device, 109, displays what is considered private information for that particular customer such as item descriptions and personalized promotions. Any part of the content that is considered private information is not displayed on the public screen, 110. At the same time, a store owner, 111, may monitor the corresponding transaction and access what is considered confidential information for the store on the owner's screen. The current invention enables the use of intelligent informational kiosks installed in retail stores as a wireless point of presence, 106, with built-in public displays, 110. It transforms such kiosks into flexible points of sales allowing customers to browse the store merchandise catalog and buy directly from there. This can be particularly useful for items that are not physically displayed or available in a particular store, but available in another distribution center. At initial connection time, that customer would need to log-on to the wireless points of presence, 106, to access the service. However, the kiosk can detect the presence of its valued customer and give a welcome message without logging in, 507.

In some embodiments of the present invention, as the customer logs in, the apparatus built according to this invention registers the MAC address of the customer's personal device and associates that address as a device for that customer, 505. This is generally maintained until the customer logs out or until the apparatus detects inactivity in the communication connection between the customer's personal device and the wireless points of presence for a specific period of time. The period of time, often, depends on the particular application and/or scenario, say anywhere from 1 millisecond to several hours. Sometimes, the registration is maintained until the personal device gets disconnected for a period of time. This period of time can again depend on the application and/or scenario, generally anywhere from 1 millisecond to several hours, 514, 513. If any of these conditions arise, the MAC address will be disassociated from the customer and in some cases, the communication connection may even get terminated.

For user-friendliness, pre-registering a personal device is advantageous in that it is done only once. With a customer's personal device registered at a store, wireless points of presence, 106, 107, 108, the system is able to identify the customer through a device identification address such as the MAC address of the device.

Customers would be able to access personalized promotions for a product based on their customer category and their shopping history. The Web page for the product selected contains different promotional offers for each category of customers. This customized promotion part of the content is not displayed on the public kiosk screen, 512, 515, but it is displayed on the customer's personal device instead, 511, 510, 515. Because the user has been identified, the content distribution server knows which group the customer belongs to and therefore which parts (and versions) of the Web content should be sent to the Bluetooth personal device and which parts should be sent to the kiosk display, 508. Customers can use the navigational links, 517, sent to their personal devices to navigate through the Web site, 516, while the kiosk display, 110, the merchant's display, 111, and the display on the personal device, 109, will be updated accordingly.

The display on the kiosk, or at the merchant's own monitor, may be split logically or physically so that it can serve multiple users in different sessions at the same time. When the display is split logically, the kiosk will depict information destined to each individual user at a time, and switch among the users based on a predefined timing rule, or based on an explicitly user input. When the display is split physically, the viewable area on the display will partition itself and each partition will depict information relative to each individual user in different sessions using the display simultaneously.

Figure 2:
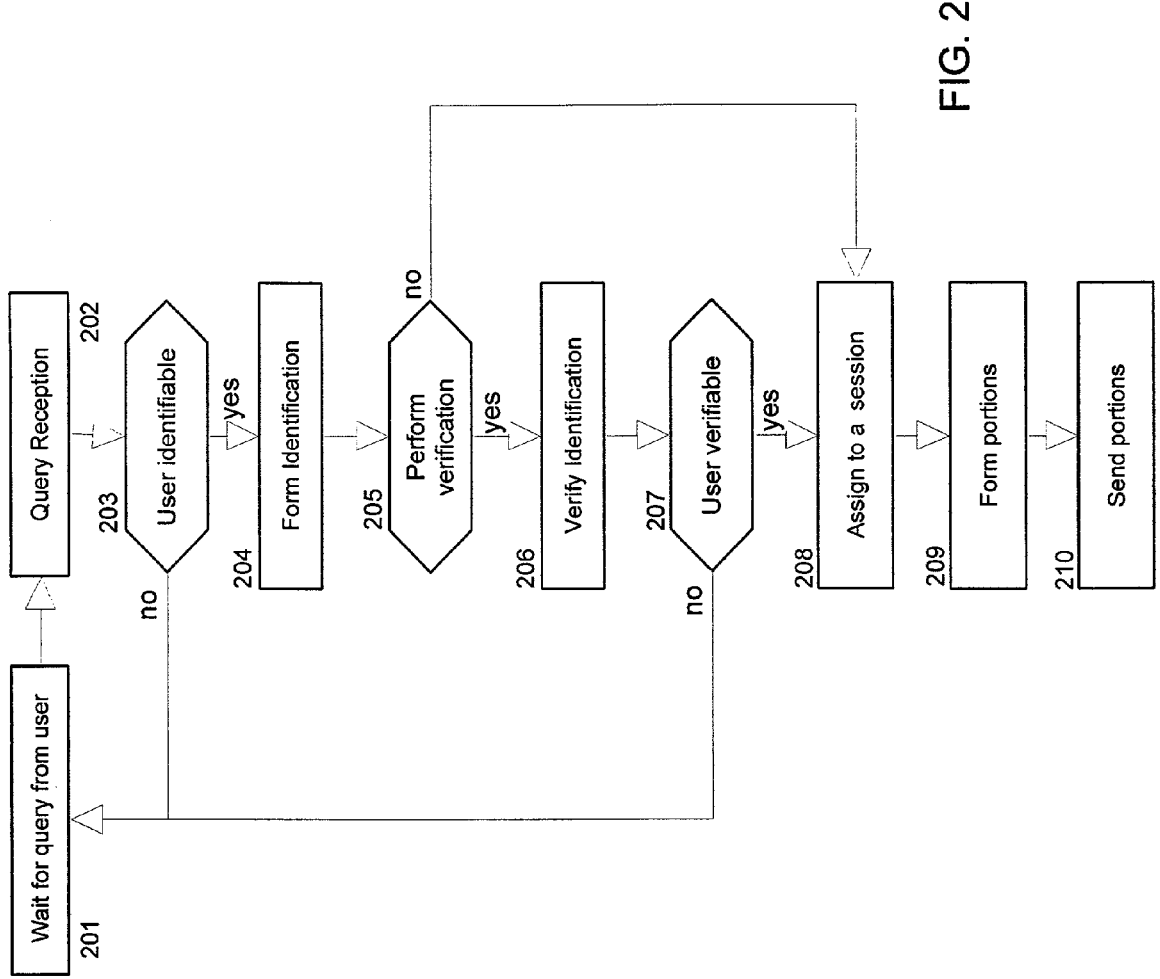
FIG. 2 shows an example of steps involved in this invention.
Figure 3:
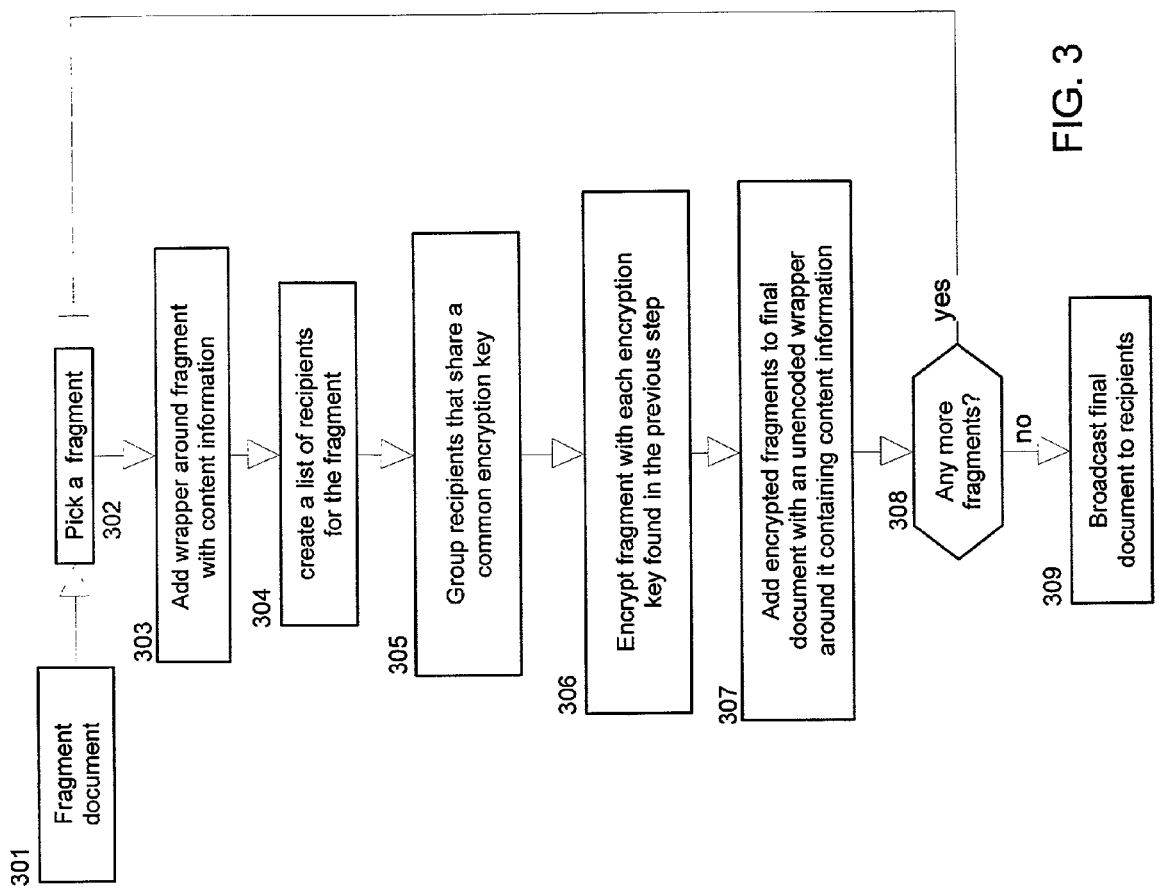
FIG. 3 shows an example of a flow chart for content distribution by encryption.
Figure 4:
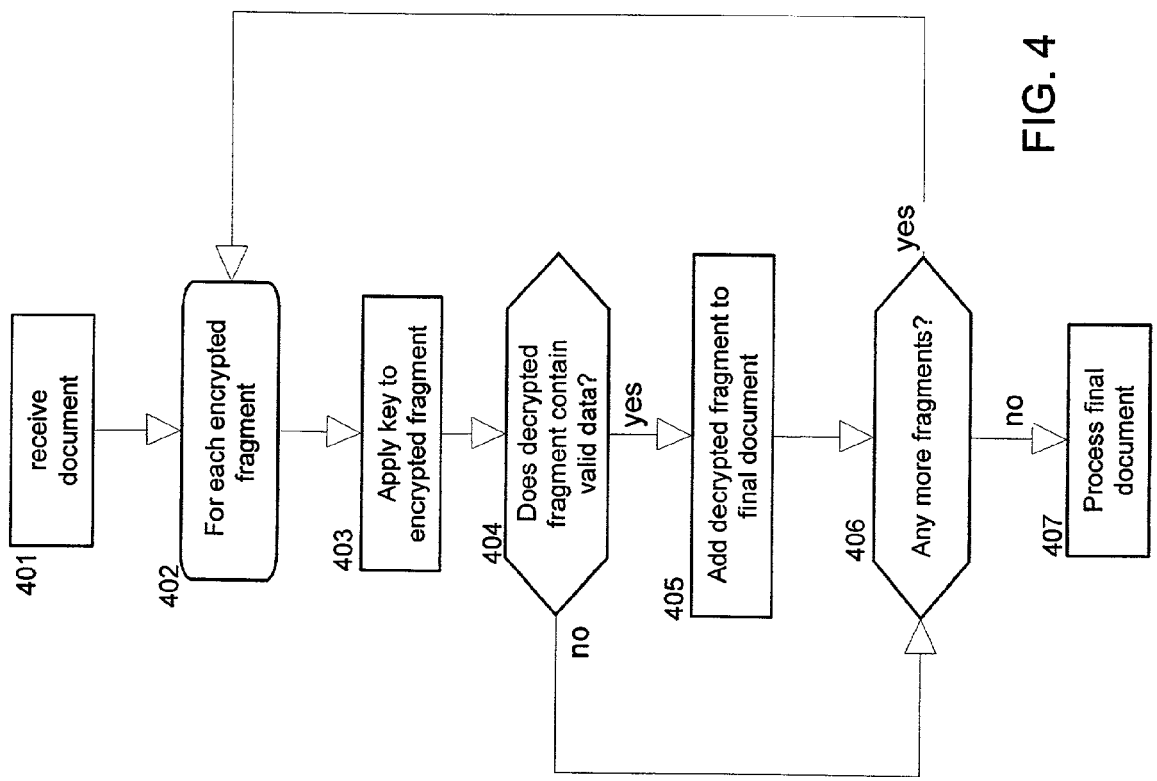
FIG. 4 shows an example of a flow chart for decrypting a received document that was distributed using the content distribution by encryption.

FIG. 1 highlights example elements of an advantageous embodiment for the present invention. The main teachings of the invention are highlighted in FIG. 2. In particular, the present invention includes a method for the distribution of portions of a document to different devices in response to a user query. As FIG. 1 shows, the documents are sent by a content distribution server who retrieves them from publication server(s). Typically, the server waits 201 until it receives a query by a user. Upon reception of the user query 202, the content distribution server utilizes an identifier for the user or its device. For example, the content distribution server could extract the device IP address from the query message. Users may determine which devices they have control over. These devices may be used to render different portions of a document.

Based on the extracted identifier and the queried document, the server sends back a response to the device designated by the user. In this step of responding, the server retrieves the requested document and extracts 209 a first portion of the document depending on the aforementioned identifier. The server then sends 210 this portion of the document to the user's device and, on occasion, sends other portions of the document to other devices.

Based on their user identity 203, the content distribution server assigns the user to a document distribution session 208. The session may either be a new one just initiated 208, or an existing one which the user joins. The session here represents a period of time during which one or more users participate in the same sequence of content distribution instances. In other words, users in a particular session view various portions of the same documents in the same sequence, where each document sending to the users of the session can be traced to a unique query originated by one of the members of the session.

In FIG. 1 the document responding server functionality and the identity matching functionality are collocated in the same box, the content distribution server, but this is not a requirement for the present invention. The two functionalities can be considered independent of each other. However, since sending a document to a user depends on who the user and which device is used, the identifier functionality needs to formulate 204 and communicate to the responding server a trigger, e.g., a message, pertaining the identifier.

Additionally, even though only the identifier is needed for forming the portions of the document to be sent to various devices, the server may verify, e.g., authenticate, 206 the user or the user's device to make sure that the document is sent to the proper recipient that satisfied the proper credentials. The functionality of identifying a user or a device and verifying it can be performed by two distinct entities not necessarily collocated. Finally, when the user or a device cannot be identified or verified, the processing of the query stops; decision points 203 and 207 when decision outcome is "no".

There are several means by which users and/or devices can identify themselves. On occasions, a user may even be identified by the device the user carries and information stored in this device. The identity can be used for device identification, device group identification, user identification, user group identification and so on. The user could also be identified through either a log-in process, a verification (digital) signature contained in the query, or he could use an RF id tag. Biometric data, smart cards, personal magnetic badges, identifiers for network adapter interfaces, security chips in devices or any combinations of the techniques mentioned above can also be used for the purposed of user and device identification. To verify the user identification 206, 207 the server may 205 also challenge the user to identify himself through for example password authentication. All the above mentioned methods used for user identification can also be employed for user verification.

If the user does not carry a device with his own credentials, he may use another device supplied to him by a third party which could be a person or a business. To first identify himself with the system 203, 204, the user can employ any combination of the following techniques: log-in, clicking on a hyper-link to input personal information, sending e-mail to the system, and the like. He could also use any other user defined criteria. Once the user has identified himself to the system, a temporary account can be assigned to him for the length of the session. In the architecture, the identification steps and the content distribution steps do not have to be performed by the same server.

There are many ways to process a document to protect the privacy of the users. One approach is to associate encryption keys with each group of users. The portions of documents, 301, 302, 308, allowed to go to each group, 304, are identified, 305, and encrypted with the corresponding group's encryption key, 306. The resulting document contains different portions encrypted with different keys, 307; it can be broadcasted or sent to each member of the session individually, 309. At reception of the encrypted document, 401, the members' devices are then able to decrypt only all those portions, 402, 406, that are meant to be rendered by them since they can only decrypt the portions, 403, that have been encoded with the key corresponding to the one they have, 404.

Markers could be used to delimit the different encrypted portions in order to facilitate the decryption work, 303. After the allowed portions for a group have been identified and encrypted, they are added to the resulting document, 307, that contains a sequence of encoded portions. A marker like an XML start tag could be put before each encoded portion to allow partitioning of the resulting document in several encoded portions. This marker could contain more information and explain the type of data being encrypted, its length and potentially other pieces of information. When a device receives an encoded document, it can look for this markers to know where the encoded portions start. If the marker contains richer information the device can use it to know if the decoded data actually represents usable data, 404, before being added to the final document, 405, and the final document is sent for any additional processing required, 407. For example, if the marker says that the encoded data is a gif image, the device knows if what it decoded is a gif image if the data after decryption has starts with the typical gif header. So the use of markers makes decoding of allowed portions of the document more efficient.

To make identification of usable data easier after decoding, markers could be used in complementary way: the same type of marker as described above could be added to the portion before its encoding. After a portion allowed for a group of users has been identified, a marker could be prepended to that portion. Like before the marker could be a simple XML start tag or it could be richer by containing information on the data itself. Then this concatenation of marker and data portion would be encrypted with the group encryption key. When receiving an encoded document, a device could identify that a portion is for him by recognizing the marker after it has decoded a portion of the received encoded document.

Markers added before encryption and markers added after encryption could be combined to make a more efficient system: at decryption time, the device identifies where each encoded portion starts using the marker that was added after encryption. Then it can use the marker added before encryption to identify if the decoded data represents actual data. This last point could be achieved by having the device recognize that the marker added after encryption has been decoded in a meaningful way by its key. It could also be done by matching the external marker with the internal marker when the same marker is used before encryption and after encryption. If they are the same, the device has successfully decoded the portion. If they are different, the portion was not for that device.

The documents being accessed by the various groups of users contain public information everybody is allowed to receive and therefore could be displayed on public displays but it also contains information private to each group. Only the members of a specific group are be allowed to receive the corresponding private part of the document. Therefore this part of the information is not sent to public displays, it is sent to the users' personal devices. This private information can be information that the user does not want to share with other users because it is personal information such as description of an item being bought or credit card information. It can also be information the author of the document wants to pass to the user without being seen by other users. For example, it could be a special promotion on some item for a specific customer.

So, the documents can be split based on what part is public and what part is private. Preference criteria can also be taken into account when building the various portions. The application author might design an initial general policy specifying what is private to a group and what is public to everybody, 501. But then each individual can have preferences that modify the way the distribution of the content is done. A specific user can build a preference profile indicating what he considers private and what he considers public therefore modifying any general rules that could have been written by the application developer. Other types of information can affect the splitting of a document. It can be context information such as time of the day, day of the year, store inventory status. It can also be information about the user himself such as user shopping history, user affiliation, his ethnic background and so on. Some of these pieces of information or all of them could be used to modify the rules of document splitting. As an example, a store could offer several promotions on an item and one could be chosen to be sent to a user based on his shopping history. The splitting rules can be dynamically modified by the user at any time including during a session he would be taking part in. He could decide that a piece of information he used to think of as public should now be made private. He could then use a drag and drop technique to show that he wants some part of the content that has been sent to the public display to become private. If the user is currently part of a session, the consecutive access to content would immediately reflect the change of rule.

Since not only one user will be accessing the content distribution system, but rather a plurality of users, the implementation of the profile database should not only be able to maintain and utilize the profiles of the users currently corresponding with the system, but should support the maintenance of multiple user accounts, such that upon return of known users to the system the previously active profile can be reused. Otherwise this might inconvenience the user of having to go through the steps of setting up a profile every time he wants to reuse the system.

The preference criteria previously mentioned can also be used to form an initial profile database. In this case the application author's idea of what kind of information should be considered as public and which parts should remain private would directly go into the preferences of the user. This is very useful since the application designer should have the best feeling about the privacy level of the content he wrote.

The information related to a customer that is stored as the previously mentioned identifier may contain temporary information or information that needs to be updated upon certain events such as change of customer status level, customer related information or password. Also the reset of the customer password may serve as an update criterion for the identifier. Updates can also take place in regular intervals.

To enhance further the customer shopping experience and satisfaction, hence, increase the selling opportunities, the kiosk can provide superior customer and sales support. With this invention, the store also wants to provide sales or technical support to the customers based on each individual's need, without, however, interfering directly with the customer's shopping experience and habits. For this reason, a sales person may be monitoring remotely what customers browse on the kiosks. On the sales person's computer screen, a partial view or a summary of what a customer sees at a kiosk will be provided. This summary may be supplemented with potentially confidential information on the product such as a whole sale price. The sales associate may also employ a primitive messaging service to communicate with the customer by his/her personal device at the kiosk whenever needed. If, at some point, a customer may need some additional assistance, the customer would pass a short question through the messaging service; the sales associate that received the question could provide a short answer potentially using the additional information that was provided only to the sales associate. When the customer decides to buy merchandise, the wireless point of presence sends the order/purchase form to the customer's personal device. The personal information the customer enters into the form is not displayed on the kiosk screen for privacy reasons. Once all the information is filled out, an electronic check is issued using a digital signature. The signed payment is then sent to a cashier for her endorsement. The cashier endorses the payment using the cashier's digital signature and the endorsed payment is routed to the bank.

The present invention can be realized in hardware, software, or a combination of hardware and software. Thus an apparatus may be used having means to implement the method steps of the invention in matters known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method comprising:
providing information responsive to a user's query, said information having a first portion and at least one other portion;
identifying said user's meeting a first identification criterion;
forming a user identification when said first identification criterion is met;
employing said user identification in splitting said information to form said first portion of the information and said at least one other portion of the information;
forwarding said first portion of information to a first device and said at least one other portion of information to at least one other device, said at least one other device not requiring any relationship to said first device;
wherein content included in said first portion of information and included in said at least one other portion of information is based on a preference criterion; and
wherein said preference criterion is a criterion selected from a group of criteria including: security level; user profile; user data; user history; preferred customer status; user affiliation; user service level association; time of day; day of year; religion; ethnic background; national background; gender; sexual orientation; demographic information; context; inventory; classification level; and any combination of the above criterion.

2. A method as recited in claim 1, wherein said step of identifying is performed by an identifier, and step of employing is performed by a respondent server.

3. A method as recited in claim 2, wherein said respondent server is also said identifier.

4. A method as recited in claim 1, wherein said first device is a user device employed in making said query, and said step of identifying includes identifying said user device employing identification criteria.

5. A method as recited in claim 4, wherein one of said identification criteria is a criterion selected from a group of criteria including: identifying a device identification; identifying a device group identification; identifying a user identification; identifying a user group identification; authenticating user of said device by user identification and password; employing a verification signature included in said query; employing an RF id tag; employing a 3rd party mechanism; and any combination of said criterion.

6. A method as recited in claim 4, further comprising:
said user employing said first device in a session; and
associating said user for said session employing said verification.

7. A method as recited in claim 1, further comprising a first entity supplying said first device to a user.

8. A method as recited in claim 7, wherein said first entity is a business and said user is a customer.

9. A method as recited in claim 1, wherein said step of receiving said query said user's meeting a first identification criterion, includes at least one step from a group of steps including:
user pre-registering query; utilizing user criteria; selecting a hyper-link; sending mail.

10. A method as recited in claim 1, wherein said first portion of information includes private user information and said at least one other portion of information includes public information.

11. A method as recited in claim 1, further comprising changing preference criteria dynamically.

12. A method as recited in claim 11, wherein said step of changing preference criteria is performed dynamically during a session.

13. A method as recited in claim 12, wherein preference criteria change dynamically during a session by a user.

14. A method as recited in claim 1, further comprising forming a user profile database for a plurality of users.

15. A method as recited in claim 14, wherein said step of forming is repeated in accordance with a database update criterion.

16. A method as recited in claim 15, wherein said database update criterion is a criterion selected from a group of criteria including:
    change of preference criteria by user; change of identification criteria; information access; change of context; and
    any combination of the above criterion.

17. A method as recited in claim 14, wherein said step of forming an identification when said first identification criterion is met, indudes:
    identifying user; and
    associating said user with said user profile.

18. A method as recited in claim 14, wherein said step of forming an identification when said first identification criterion is met includes:
    associating said identification criterion with user profile.

19. A method as recited in claim 1, further comprising forming a user profile database for a plurality of users based on said preference criteria.

20. A method as recited in claim 19, wherein said step of employing said identification in forming said first portion of information and said at least one other portion of information, includes:
    creating rules for forming said first portion and said at least one other portion based on said preference criteria;
    employing said rules to form said first portion and said at least one other portion.

21. A method as recited in claim 1, wherein said step of forming an identification when said first identification criterion is met, includes:
    identifying user;
    associating said user with said identification criterion.

22. A method as recited in claim 1, further comprising providing a program storage device readable by machine, tangibly embodying a program of instructions executable by the machine to perform the method steps of providing information, forming, employing and forwarding.

23. An apparatus comprising:
    means for routing responsive to a user's query information having a first portion and at least one other portion, said a first portion of information being routed to a first device and said at least one other portion of information being routed to at least one other device, said means for routing including:
    means for receiving said query and identifying said user's meeting a first identification criterion;
    means for forming a user identification when said first identification criterion is met;
    means for employing said user identification in forming said first portion of information and said at least one other portion of information;
    means for forwarding said first portion of information to said first device and said at least one other portion of information to said at least one other device, wherein said forwarding of said first portion and at least one other portion requiring no persistent or predetermined order;
    wherein content included in said first portion of information and included in said at least one other portion of information is based on a preference criterion; and
    wherein said preference criterion is a criterion selected from a group of criteria including: security level; user profile; user data; user history; preferred customer status; user affiliation; user service level association; time of day; day of year; religion; ethnic background; national background; gender; sexual orientation; demographic information; context; inventory; classification level; and any combination of the above criterion.

24. An article of manufacture comprising a computer usable medium having computer readable program code means embodied therein for causing information routing, the computer readable program code means in said artide of manufacture comprising computer readable program code means for causing a computer to effect the steps of:
    providing information responsive to a user's query, said information having a first portion and at least one other portion;
    identifying said user's meeting a first identification criterion;
    forming an user identification when said first identification criterion is met;
    employing said user identification in splitting said information to form said first portion of the information and said at least one other portion of the information;
    forwarding said first portion of information to a first device and said at least one other portion of information to at least one other device, said at least one other device not requiring any relationship to said first device;
    wherein content included in said first portion of information and included in said at least one other portion of information is based on a preference criterion; and
    wherein said preference criterion is a criterion selected from a group of criteria including: security level; user profile; user data; user history; preferred customer status; user affiliation; user service level association; time of day; day of year; religion; ethnic background; national background; gender; sexual orientation; demographic information; context; inventory; classification level; and any combination of the above criterion.

25. A computer program product comprising a computer usable medium having computer readable program code means embodied therein for causing routing, the computer readable program code means in said computer program product comprising computer readable program code means for causing a computer to effect the functions of:
    means for routing responsive to a user's query information having a first portion and at least one other portion, said first portion of information being routed to a first device and said at least one other portion of information being routed to at least one other device, said means for routing including:
    means for receiving said query and identifying said user's meeting a first identification criterion;
    means for forming an user identification when said first identification criterion is met;
    means for employing said user identification in forming said first portion of information and said at least one other portion of information;
    means for forwarding said first portion of information to said first device and said at least one other portion of information to said at least one other device,
    wherein content included in said first portion of information and included in said at least one other portion of information is based on a preference criterion; and
    wherein said preference criterion is a criterion selected from a group of criteria including: security level; user profile; user data; user history; preferred customer status; user affiliation; user service level association; time of day; day of year; religion; ethnic background; national background; gender; sexual orientation; demographic information; context; inventory; classification level; and any combination of the above criterion.

* * * * *